2,716,092
Patented Aug. 23, 1955

2,716,092

VINYL CHLORIDE RESINS STABILIZED WITH A MIXTURE CONTAINING A PHENOLATE AND A POLYVALENT METAL SALT OF A FATTY ACID

William E. Leistner, Brooklyn, and Arthur C. Hecker, Richmond Hill, N. Y.

No Drawing. Application February 4, 1953,
Serial No. 335,166

7 Claims. (Cl. 260—23)

This invention relates to a stabilizer for chlorine containing plastics and to plastic compositions stabilized therewith.

The invention is particularly useful in connection with the improvement of polyvinyl chloride resins and, for that reason, will be illustrated by detailed description in connection with such polyvinyl chloride resins.

The stabilization of the vinyl chloride polymers has been a problem of long standing.

In U. S. Patent 2,564,646 issued to us jointly with Olga H. Knoepke, on August 14, 1951, we have described a stabilizer and anti-clouding composition for vinyl chloride resins, the composition consisting, for example, of tricresyl phosphite and a polyvalent metal salt such as the mixed berium and cadmium salts of 2-ethyl hexoic acid. This composition of the said patent is in extensive and successful use.

The present invention is directed to the stabilization against discoloration or blooming or both. Discoloration of vinyl chloride plastics at elevated temperatures occurs frequently. Blooming also occurs in many stabilized vinyl resin compositions, at least under extreme conditions of use. This blooming represents separation of an ingridient from the plastic. When it occurs, it interferes with the appearance, printing upon, and sealing of the plastic.

We have now discovered a composition which, when incorporated into vinyl chloride resins, stabilizes them. The new composition increases the color stability in marked manner and decreases or eliminates blooming.

Briefly stated, our invention comprises the herein described stabilizer composition, new compounds, and plastics containing the stabilizer. In the preferred embodiment, the invention comprises vinyl chloride resins admixed with a polyvalent metal salt or salts of hydrocarbon-substituted phenol. In other embodiments the invention comprises such polyvalent metal salt in conjunction with a water insoluble polyvalent metal salt of a fatty acid, the mixture of the two materials containing to advantage both berium and cadmium in the polyvalent metal component. In a modification, the invention comprises the phenolates and the said salts in conjunction with an organic phosphite.

In the plastics made according to the invention there is incorporated a usual plasticizer for the polyvinyl chloride resin and, if desired, a conventional parting agent of which stearic acid is an example.

The following data illustrate the stabilizing effect of the phenolates as measured by discoloration of vinyl chloride resins on being maintained at the temperature of 350° F. The base plastic stock was of the following composition:

| | Parts |
|---|---|
| Polyvinyl chloride resin (Geon 101) | 100 |
| Dioctyl phthalate plasticizer | 50 |
| Stabilizer composition, as stated below. | |

To this basic plastic stock there was added in the first preparation barium octylphenolate, 1 part for 100 of the Geon 101. On milling the stock during manufacture at 350° F., the stock did not turn brown as would have been the case without the octylphenolate, but instead, developed only a light amber color. A deep brown color did develop, however, in 15 minutes of additional heating at 350° F.

When the basic plastic was mixed with the 1 part of barium octylphenolate and also 1 part each of cadmium 2-ethylhexoate and tricresyl phosphite, the vinyl plastic so made did not develop any color during the milling. On being maintained for 90 minutes at 350° F., the stock developed a yellow color that is considered to be about equal in intensity to the amber color of the stock made with the barium octylphenolate alone in 15 minutes. For periods of time up to 30–60 minutes the composition with the 3-component stabilizer was substantially white.

When the phosphite was omitted from the 3-component stabilizer, the off-white color developed in 15 minutes, while very slight, was as much as that in 45 minutes when the 3-component stabilizer was used, the phenolate used in this pair of tests being strontium octylphenolate.

In all cases, the use of the alkylphenolate also prevented objectionable blooming.

Other tests showed a marked improvement from the use of a cadmium salt, as, for instance, the ethylhexoate with the barium salts of substituted phenol of which barium octylphenolate is an example.

Once these results have been observed, various theories may be advanced to explain the mechanism by which the improvement is obtained. We consider that the substituted phenolate, on acceptance of hydrogen chloride formed by decomposition of the vinyl chloride resin, develops free substituted phenol and the substituted phenol, with its high content of hydrocarbon group, is a blending agent for the various materials of the plastic composition including the salts of the fatty acids or free fatty acids themselves that may be liberated from such salts by hydrogen chloride from the vinyl resin. Furthermore, we consider that the phenolate decreases the proportion of conjugated polyene structure formed by dehydrochlorination of the original polyvinyl chloride material. Reducing the polyene formation decreases the tendency to oxidation and the resulting cross linking of the polymer chains which, when occurring, cause embrittlement of the vinyl plastic, particularly under the influence of ultraviolet light and oxygen. To the extent of decreasing this effect, our composition acts as an anti-oxidant.

The methods of manufacture of the plastics containing our improved stabilizer composition is that which is usual in the plastics art. Thus, we mix the selected stabilizer composition with the plasticizer and then blend this resulting mixture with the vinyl chloride resin on plastic mixing rollers. In typical preparations we have milled the plasticizer and stabilizer mixed with the polyvinyl chloride resin on a 2-roll mill at 300°–350° F. After the whole is a uniform plastic mass, then it is sheeted in conventional manner.

In the manufacture of rigid polyvinyl chloride compositions, the procedure stated is modified by the omission of the plasticizer component or the use of only a small proportion thereof.

As to the vinyl chloride resin for use in making the plastics of the present invention, we may use vinyl chloride polymer or copolymers such, for instance, as the copolymer with vinyl acetate, vinylidene chloride or styrene. There is no advantage in using other halides than the chloride in the resin and there are disadvantages as in the costs of the other halogens as compared to chlorine.

The plasticizers for the vinyl resin may be any of the usual ones. Examples are the substantially non-volatile liquid solvents for vinyl chloride resins, such as dioctyl phthalate, dioctyl sebacate, or tricresyl phosphate. They are used by us ordinarily in the proportion of 50 parts for 100 of the resin, but, in making harder or rigid stocks, the plasticizer may be reduced to as little as 5 parts or even omitted entirely.

The substituted phenolates in our invention are those containing 4–24 carbon atoms in the alkyl, aryl, or aralkyl substituent that may be in the form of mono-, di-, or tri-alkyl or aryl groups, the total carbons in the substituent (one or more groups) totalling 4–24.

Examples of phenols that are used in the form of the metal phenolates are butyl, amyl, octyl, nonyl, dodecyl, octadecyl, and oleyl phenol; dibutyl, diamyl, dinonyl, and didodecylphenol; di-t-butyl-o-methylphenol (di-t-butyl-o-cresol), the corresponding p-compound, and the corresponding amyl and hexyl compounds; o- or p-phenylphenol, 2-methyl-4-toluylphenol, 2,4-dimethyl-5-phenylphenol, and p-benzylphenol. The phenol used must be soluble in the mixed vinyl chloride resin and plasticizer mixture.

If it is desired to use one of the substituted phenols that has not been prepared heretofore, then the new phenol is prepared according to technique that is known for making homologs or isomers of the desired substituted phenol. The general method used is the Friedel and Craft condensation using anhydrous aluminum chloride with (1) phenol or a derivative thereof such as cresol or phenylphenol and (2) either an olefin (or the corresponding alkyl) halide or an aryl halide. Thus, to make octylphenol the reaction mixture will contain phenol, either octylene or octyl chloride, and aluminum chloride as the catalyst or condensing agent. Likewise, to make the corresponding dodecyl phenol there would be used dodecylene or dodecyl chloride. The same type of substitution is useful throughout the entire series, the number of molecules of olefin or halide selected containing the number of total carbons that it is desired to have in the substitutent of the finished substituted phenol.

The polyvalent metal salt of the substituted phenol must be insoluble in water and compatible with the vinyl chloride resin when warmed therewith.

Polyvalent metals giving such phenolates are the alkaline earth metals, examples of which are barium, strontium and calcium. Other metals that are satisfactory are cadmium, zinc, lead, and tin. Where these salts are not known, they are made by the usual type of reaction, as by mixing the hydroxide of the selected metal with the selected phenol in equivalent amount, suspending in benzene or the like, and refluxing until reaction is complete. They are made also by reacting an aqueous solution of a salt of the selected metal with the selected phenol in alkaline aqueous or aqueous alcoholic solution, the precipitated material being separated from the liquid that remains and being subsequently washed and dried.

The fatty acid salt of the polyvalent metal may be any one of those described in the said patent although mixed barium and cadmium salts give the best results. Examples are zinc, cadmium, lead, and barium 2-ethyl hexoate, laurate, stearate, and ricinoleate.

We have found especially beneficial results when the stabilizer contains both barium and cadmium in the metal component of the stabilizer. For this reason, we use to advantage mixed barium and cadmium substituted phenolates or such a mixture as that of barium alkylphenolate with a cadmium salt of a fatty acid containing 6–18 carbon atoms to the molecule, examples of such salt being cadmium 2-ethylhexoate, cadmium laurate, or cadmium stearate.

The phosphite used may be any one of the organic phosphites described in the said patent. Examples of such phosphites that are used are the alkyl, aryl, and aralkyl phosphites, such as triphenyl, tricresyl, tridimethyl-phenyl, tributyl, trioctyl, and tridodecyl phosphites. The phosphites used should be substantially non-volatile under the conditions of processing and use of the vinyl resin.

As to proportions we use about 0.5–10 parts of the whole stabilizer composition for 100 of the vinyl chloride resin.

When the three-component stabilizer composition is used a good proportion is 1 part of the substituted phenolate to ½ part each of the metal salt of the fatty acid and of the alkyl or aryl phosphite. When proportions substantially less than 0.5 part of total stabilizer mix are used for 100 parts of the resin, there is not obtained the desired effect on stabilization, anti-clouding, and resistance to blooming of the finished plastics. When amounts substantially larger than the 10 parts stated above as the maximum are used, there is not an offsetting gain to compensate adequately for the extra cost of the stabilizer used.

The invention will be further illustrated by description in connection with the following specific examples of the practice of it. The standard procedure is not an example of the invention but a conventional operation added for comparison.

STANDARD PROCEDURE 100 parts Geon 101 (vinyl chloride polymer)
50 parts dioctyl phthalate
½ part stearic acid (as parting agent)

These materials are weighed and stirred together. The mixture is then heated on a two-roll mill up to 300° F. and milled until uniform or substantially so.

*Example 1*

100 parts of Geon 101
50 parts dioctyl phthalate
2 parts barium nonylphenolate

These are mixed and milled as described in the standard procedure. The samples taken show that discoloration starts only after 15 minutes and develops to a substantial though much lesser degree than in the standard procedure.

*Example 2*

100 parts of Geon 101
50 parts dioctyl phthalate
3 parts strontium amylphenolate
1 part cadmium naphthenate These are mixed and milled as described in the standard procedure. Only after 30 minutes does slight discoloration set in. It develops very slowly.

*Example 3*

100 parts of Geon 101
50 parts dioctyl phthalate
3 parts barium octylphenolate
1 part cadmium 2-ethylhexoate
1 part trioctyl phosphite After 1 hour of mixing as described no substantial discoloration was noted.

*Example 4*

In place of the cadmium salts in the Examples 2 and 3, we have substituted zinc caprylate with the same favorable effect.

*Example 5*

The procedure of any one of the Examples 1–4 is followed with the substitution of any one of the alternative materials disclosed earlier herein for each of the following classes of the components: the vinyl resin, plasticizer, phenolate, salt (or soap) of the polyvalent metal, and phosphite. The substitution is made on an equal weight except that the substitution is made on an equal metal content basis in the case of the phenolates.

Example 6

100 parts of Exon 402A (polyvinyl chloride)
2 parts cadmium dodecylphenolate

These materials are milled for a half hour on a two-roll mill with roll temperatures of 325° F. No discoloration was observed during the milling.

Example 7

The procedure of any of the Examples 1–5 above is followed with the omission of all of the plasticizer of those examples. The products made are suitable for use in rigid form and have approximately the same stability against discoloration as has been described above.

It will be understood also that it is intended to cover all changes and modifications of the examples of the invention herein chosen for the purpose of illustration which do not constitute departures from the spirit and scope of the invention.

We claim:

1. A vinyl chloride resin stabilizer comprising a polyvalent metal salt of a substituted phenol and a water insoluble polyvalent metal salt of a fatty acid containing 6–18 carbon atoms to the molecule, the said salt of the phenol being substantially insoluble in water and compatible with vinyl chloride resins and the substituent in the phenol being hydrocarbon and containing a total of 4–24 carbon atoms.

2. The stabilizer of claim 1 in which the metal in the salt of the substituted phenol is barium and the metal in the salt of the fatty acid is cadmium.

3. A plastic comprising a polyvinyl chloride resin and the stabilizer of claim 2 mixed into the resin.

4. The stabilizer of claim 1 which includes also an organic phosphite selected from the group consisting of alkyl, aryl, and aralkyl phosphites.

5. A plastic composition comprising a polyvinyl chloride resin and the stabilizer of claim 4 admixed into the said resin.

6. A plastic composition comprising a polyvinyl chloride resin and a stabilizer therefor, the stabilizer including a barium hydrocarbon-substituted phenolate and the cadmium salt of a fatty acid containing 6–18 carbon atoms to the molecule, the hydrocarbon substituent in the phenolate containing a total of 4–24 carbon atoms and the said phenolate and salt being mixed substantially uniformly into the plastic.

7. The stabilizer composition of claim 1, the metal salt of the substituted phenol being barium octylphenolate.

References Cited in the file of this patent

UNITED STATES PATENTS

| | | |
|---|---|---|
| 2,197,833 | Reiff | Apr. 23, 1940 |
| 2,256,625 | Quattlebaum | Sept. 23, 1941 |
| 2,564,646 | Leistner et al. | Aug. 14, 1951 |